United States Patent [19]

Neunier et al.

[11] Patent Number: 4,758,365

[45] Date of Patent: Jul. 19, 1988

[54] POLYMERIC ADDITIVES USEFUL FOR INHIBITION OF THE DEPOSIT OF PARAFFINS IN CRUDE OILS

[75] Inventors: Gilles Neunier, Bourg de Mazerolles; Reé Brouard, L'Isle Adam; Paul Maldonado, St. Symphorien D'Ozon; Jean-Luc Volle, Le Fauga, all of France

[73] Assignee: Societe Nationale Elf Aquitaine & Ceca S.A., Courbevoie, France

[21] Appl. No.: 894,715

[22] Filed: Aug. 8, 1986

Related U.S. Application Data

[63] Continuation of Ser. No. 715,266, Jun. 14, 1985, abandoned.

[30] Foreign Application Priority Data

Jun. 21, 1984 [FR] France ................. 84 09747

[51] Int. Cl.$^4$ ............... C10M 101/04; C08F 122/04
[52] U.S. Cl. .................... 252/56 S; 526/245; 526/250; 526/251; 526/252; 526/255; 526/271; 526/292.9; 526/292.95; 526/296; 526/318; 526/318.2; 526/318.25; 526/321
[58] Field of Search ............ 526/271, 296, 249, 245, 526/250, 251, 255, 252, 294, 295, 292.9, 292.95, 318, 318.2, 318.25, 321; 585/3; 252/565

[56] References Cited

U.S. PATENT DOCUMENTS

| | | | |
|---|---|---|---|
| 2,892,820 | 6/1959 | Stewart et al. | 526/318 |
| 2,998,414 | 8/1961 | West | 526/318 |
| 3,087,893 | 4/1963 | Aguis et al. | 526/271 |
| 3,449,236 | 6/1969 | Engelhart | 208/28 |
| 3,660,057 | 5/1972 | Inyckyj | 585/3 |
| 3,694,176 | 9/1972 | Miller | 208/28 |

FOREIGN PATENT DOCUMENTS 0075820 10/1982 European Pat. Off. ........... 526/317

*Primary Examiner*—Joseph L. Scofer
*Assistant Examiner*—Peter F. Kulkosky
*Attorney, Agent, or Firm*—Burgess, Ryan & Wayne

[57] ABSTRACT

This invention relates to polymeric additives useful for inhibition of the deposit of paraffins and improvement of the flow properties of crude oils and to compositions containing crude oils and such additives. The polymeric additive according to the invention consists of a polymer formed by units derived from one or more alkyl esters of unsaturated monocarboxylic acids, one or more unsaturated alpha, beta-dicarboxylic compounds in the form of diacids, low alkyl diesters or anhydrides and one or more monomers having ethylenic unsaturation of the general formula $CH_2=CZ_1Z_2$, in which $Z_1$ and $Z_2$ are the same or different and represent hydrogen, a halogen, a saturated, unsaturated or aromatic hydrocarbon group or an ester or ether group. Compounds containing a crude oil and 5 to 4000 ppm and preferably 100 to 1500 ppm of the additive have much improved flow properties.

20 Claims, No Drawings

POLYMERIC ADDITIVES USEFUL FOR INHIBITION OF THE DEPOSIT OF PARAFFINS IN CRUDE OILS

This application is a continuation of application Ser. No. 745,266 filed June 14, 1985, now abandoned.

The present invention relates to polymeric additives useful for inhibition of the deposit of paraffins and for improvement of the flow properties of crude oils and also concerns compositions containing crude oils and such additives.

Crude oils can contain significant fractions of paraffins, the exact quantity and nature of which are variable, depending upon the extraction fields. At well temperatures, paraffins are liquids and dissolve in the crude oil. When the oil is brought to the surface, its temperature drops and the paraffins crystallize, forming a three-dimensional mass of needles and platelets. This results in a loss of fluidity which renders production, transport, storage and even treatment of these oils very difficult. Blockages in pipelines and in treatment apparatus are frequent.

Various procedures have been proposed to resolve this problem, such as mechanical scraping and even heating of the walls. These procedures are costly and it is not always possible to carry them out. The use of additives, most frequently polymeric has also been suggested, the purpose of which is to retard or modify the crystallization of paraffins and so improve the flow properties of the oil and prevent the agglomeration of crystals formed on the walls.

Among additives of a polymeric nature, there are homopolymers and copolymers of long-chain acrylates. Copolymers of long-chain acrylates with vinyl pyridine (U.S. Pat. No. 2,839,518 (1958), Shell), dialkylaminoacrylates (DE-OFS No. 2926474 (1979), STOCKHAUSEN) or also maleic anhydride (British Patent Application No. 2082604 (1981), STOCKHAUSEN) have been described.

The presence of polar units confers a dispersant character upon the copolymer. It allows the deposit of paraffins on the walls to be avoided. Because of the higher reactivity of long-chain acrylates with respect to that of polar comonomers, incorporation of the latter is very difficult. The dispersing effect, coupled with the level of incorporation of the polar comonomer, remains very low.

On the other hand, these additives cannot be used in a universal manner for all types of crude oils, each of which is a particular case posing its own problem.

Another disadvantage lies in the fact that these copolymers are solids which are difficult to dissolve in crude oils and that their addition must take place either in hot organic solution or in emulsion.

The present invention has the object of avoiding these disadvantages and providing a polymeric additive of strong dispersing effect, usable for inhibition of the deposit of paraffins in crude oils of widely diverse origin. These additives retard the crystallization of paraffins, permit reduction of the flow point and the viscosity of crude oils and facilitate transport, storage and treatment of the latter. They are easily incorporated into crude oils.

The polymeric additive according to the invention consists of a polymer formed from units derived from:
one or more alkyl esters of unsaturated monocarboxylic acids,
one or more unsaturated alpha, beta-dicarboxylic compounds in the form of diacids, low alkyl diesters or anhydrides, and
one or more monomers having ethylenic unsaturation of the general formula:

$$CH_2=C\begin{matrix}Z_1\\Z_2\end{matrix} \qquad (1)$$

in which
$Z_1$ and $Z_2$ are the same or different and represent:
hydrogen,
a halogen, such as fluorine, chlorine, bromine or iodine,
a saturated, unsaturated or aromatic $C_1$ to $C_{30}$ hydrocarbon group,
an $$-O-\underset{\underset{O}{\|}}{C}-R_1$$

group, where
$R_1$ is a $C_1$ to $C_3$ alkyl group, or
an —$OR_2$ group, where $R_2$ is a $C_1$ to $C_{12}$ alkyl group.

The additive according to the invention is a polymer which contains by weight 20% to 99% and preferably 60% to 90% of units derived from one or more alkyl esters of unsaturated monocarboxylic acids, 0.5% to 40% and preferably 5% to 20% of units derived from one or more unsaturated alpha,beta-dicarboxylic compounds and 0.5% to 40% and preferably 5% to 20% of units derived from one or more monomers having ethylenic unsaturation of the general formula (1). Incorporation of the unsaturated alpha,beta-dicarboxylic compounds is facilitated by the presence of the monomer having ethylenic unsaturation.

Among alkyl esters of unsaturated monocarboxylic acids, use is preferably made of long straight-chain n-alkylacrylates and methacrylates, ranging in general from $C_{12}$ to $C_{30}$.

These esters can be obtained by the reaction of acrylic or methacrylic acid or their esters with straight chain aliphatic alcohols having at least 12 carbon atoms. The upper limit of 30 carbon atoms is imposed by the chain length of the aliphatic alcohols at present available commercially. Available aliphatic alcohols are mixtures of alcohols of different chain lengths, the distribution of which is in general in the following ranges by weight:

$0<C_{12}-C_{16}<10\%$ $0<C_{16}-C_{18}<40\%$ $50<C_{20}-C_{22}<100\%$ $0<C_{24}-C_{30}<10\%$

The preferred mixture of alcohols according to the invention has the following composition by weight:

$\leq C_{18}\ 0$ to $30\%$ $C_{20}-C_{22}\ 50$ to $100\%$ $\leq C_{24}\ 0$ to $20\%$ The unsaturated alpha,beta-dicarboxylic compounds in the composition of the polymer are more particularly dicarboxylic acids, such as maleic acid or alkylmaleic acids, for example methylmaleic (or citraconic) acid.

These compounds can also consist of the alkyl diesters of these dicarboxylic acids and in particular the methyl, ethyl or propyl diesters or, further, the anhydrides corresponding to these dicarboxylic acids. Within the scope of the invention, the anhydrides are preferred and, particularly, maleic anhydride.

Among monomers having ethylenic unsaturation, reference can be made to ethylene, alpha-olefins such as butene-1 or octadecene, vinyl chloride, 1,1-dichloroethylene, alpha-methylstyrene, styrene and its derivatives vinyl ethers such as methylvinylether and vinyl esters such as vinyl acetate, propionate or butyrate.

The preferred monomers having ethylenic unsaturation are octadecene-1, styrene and vinyl acetate.

The polymeric additive is obtained by polymerization of the aforementioned monomers. Polymerization can be effected in the mass, i.e. without a solvent, or also in an organic solvent in which both the monomers and the copolymer are soluble. Among these solvents, reference can be made to hydrocarbon solvents of aliphatic or aromatic structure, which are chemically inert vis-à-vis the monomers.

The preferred solvents are, for example, xylene or toluene or a cut of aromatic character.

When polymerization is effected in a solvent, the overall monomer concentration can range from 10% to 100% by weight of the solvent, the preferred concentrations ranging from 20% to 60% so as to have, after polymerization, a solution which is pumpable at a temperature adjacent the ambient temperature.

The polymerization temperature can vary widely, for example from 50° to 150° C. and preferably from 70° to 120° C.

The pressure is selected as a function of the structure of the monomers and can range from atmospheric pressure to elevated pressures of the order of 100 bars.

The unsaturated alpha,beta-dicarboxylic compound and also the monomer having ethylenic unsaturation are both utilized in a ratio of 0.05 to 0.5 mole of the alkyl ester of the unsaturated monocarboxylic acid.

Catalysts are generally selected from compounds generating free radicals soluble in the reaction medium, such as for example peroxides such as benzoyl peroxide, acetyl peroxide, ditertiobutyl peroxide or azoic compounds such as azo-bis-isobutyronitrile. In general, $10^{-5}$ to $10^{-1}$ mole of catalyst and preferably $5 \times 10^{-4}$ to $10^{-2}$ moles per mole of monomer are used.

The numerical molecular weight of the polymer can range from 5,000 to 300,000 and is preferably in the range from 20,000 to 150,000. The polydispersity can range from 2 to 7. The molecular weights are determined by gel permeation chromatrography (GPC).

The additive according to the invention is incorporated in crude oils in a concentration by weight ranging from 5 to 4,000 ppm and preferably from 100 to 1,500 ppm. Incorporation is effected at 20° above the flow point of the crude, with agitation.

EXAMPLES

The degree of polymerization of the copolymers is measured by gel permeation chromatography (GPC), which allows the molecular weight to be attained as a number in polystyrene equivalents and the polydispersity index. Infrared spectrometry is utilized to measure in the polymer the quantity of maleic anhydride introduced with respect to the initial mixture of monomers.

To determine the efficacy of these copolymers as inhibitors for the deposit of paraffins, we have utilized three different means:

the flow point according to ASTM Standard D 97 B;

the so-called "dynamic" flow test which takes account of the shear effect which may arise during transport of the crude oil. This test consists in measuring in cm the distance which the crude oil travels along a tube inclined at 5° and maintained at a temperature 10° below the setting point of the oil.

the cold plate deposit test, which consists of studying the quantity and nature of deposits of paraffins on cold walls immersed in a crude oil. A cell comprising two plates, the temperature of which is fixed at about 20° below that of the crude oil, is immersed in Crude oil maintained at its production temperature. The results are obtained by comparing the weights of deposits produced by crude oils without additives and those containing additives according to the invention. The magnitude (E) representative of the efficacy of these additives is defined by the relation:

$$(E) = \frac{E_1 - E_2}{E_1} \times 100$$

where $E_1$ = weight of deposit of a crude oil without additive
$E_2$ = weight of deposit of a crude oil containing an additive.

EXAMPLE 1

122 g (0.333 mole) of n-alkyl acrylate having an average chain length of $C_{20}$ to $C_{22}$, 4.2 g (0.042 mole) of maleic anhydride and 3.6 g (0.042 mole) of vinyl acetate in 240 g of xylene are introduced into a 1-liter reactor, previously provided with a nitrogen atmosphere. The temperature of the reactor is taken to 80° C. At the start of the reaction, 0.34 g of benzoyl peroxide is added and the temperature is maintained at 80° C. by cooling the reaction mixture. After 1 hour, 2 hours and 3 hours of reaction, the same quantity of benzoyl peroxide is added, so that the total quantity of catalyst utilized is 1.36 g. The total polymerization time is 6 hours.

The yield of the reaction is 78% and the weight of maleic anhydride as determined by IR spectrometry is 3.3%. The levels of incorporation of the maleic anhydride and the vinyl acetate are 100%. The molecular weights determined by GPC are=

$M_n = 13,700$ $M_w = 33,000$

EXAMPLE 2

122 g of the n-alkyl acrylate, 4.2 g of maleic anhydride and 4.4 g of styrene are placed in the reactor of Example 1 and are polymerized under the same conditions. The total polymerization time is 6 hours. The yield of the reaction is 79% and the level of maleic anhydride in the copolymer is determined by IR spectrometry as 3%. The level of incorporation of the maleic anhydride is 94% and that of the styrene is 100%. The molecular weights determined by GPC are $M_n = 11,000$ $M_w = 34,000$

EXAMPLE 3

Equivalent quantities to those of Example 1 are introduced into 136.5 g of xylene, the reactor having previously been provided with a nitrogen atmosphere. The temperature of the reactor is taken to 80° C. Continuously over six hours, 1.36 g of benzoyl peroxide in solution in several cc's of xylene is added. The solution is diluted with xylene to 37% by weight of solids at the end of the reaction. The yield of the reaction is 89% and the level of maleic anhydride determined by IR is 3.3%. The levels of incorporation of the maleic anhydride and of vinyl acetate are both 100%.

The molecular weights determined by GPC are $M_n = 15,000$ $M_w = 41,000$

EXAMPLE 4

Equivalent synthesis to Example 3, but the 4.2 g of vinyl acetate is replaced by 4.4 g of styrene. The yield of the reaction is 95% and the level of maleic anhydride determined by IR is 3.1%. The level of incorporation of the maleic anhydride is 94% and that of styrene is 100%.

The molecular weights determined by GPC are:

$M_n = 13,000$ $M_w = 39,000$

EXAMPLE 5

By way of comparison, 137.4 g (0.375 mole) of n-alkyl acrylate of average chain length $C_{20}$ to $C_{22}$ and 4.2 g (0.042 mole) of maleic anhydride are polymerized under the same conditions as in Example 1. The yield of the reaction is 77% and the level of maleic anhydride determined by IR is 1.9%. The level of incorporation of the maleic anhydride is 64%. The molecular weights determined by GPC are:

$M_n = 16,000$ $M_w = 44,000$

EXAMPLE 6

By way of comparison, 186.6 g (0.4 mole) of n-alkyl acrylate of average chain length $C_{20}$ to $C_{22}$ is polymerized under the same conditions as in Example 1. The yield of the reaction is 88%.

The molecular weights determined by GPC are:

$M_n = 19,000$ $M_w = 58,000$

Table I contains the characteristics of the crude oils tested and Tables II to VII the flow points and the dynamic flow test results of crude oils without additives and with variable concentrations of additives prepared according to Examples 1 to 5.

Table VIII summarizes the results of the deposit tests.

Moreover, during a test "in the field" at crude oil wells in Alsace, the use of 1000 ppm of the additive described in Example 3 permitted transport of the oil by pipeline over the distance of 15 km, without any problem of viscosity or deposit of the paraffins.

TABLE I

Characteristics of the crude oils tested.

| | Origin of the Crude | | | |
|---|---|---|---|---|
| | GABON | INDIA | NIGERIA | FRANCE (Alsace) |
| Specific Gravity Kg/m³ @ 15° C. | 852 | 820 | 873 | 830 |
| Flow point °C. | 18 | 27–30 | 40 | 27 |
| Paraffin content %[1] | 15 | 20–25 | 39 | 27,5 |
| Viscosity cSt | 40° C. 8,6 60° C. 5,9 | 22–27 @ 20° C. | 50° C. 8,4 60° C. 5,0 | 50° 4,3 60° 3,6 |

[1] gas phase chromatography

TABLE II

Crude of Indian origin

| | | Flow point °C. | | | |
|---|---|---|---|---|---|
| Additive | (ppm)* | 0 | 100 | 200 | 700 |
| Example | 1 | 30 | 27 | 21 | 15 |
| | 2 | 30 | 24 | 21 | 12 |
| | 3 | 30 | 24 | 18 | 12 |
| | 4 | 30 | 24 | 18 | 9 |
| | 5 | 30 | 27 | 27 | 21 |

*ppm of active material.

TABLE III

Dynamic Flow Test

| | | Distance travelled (cm) | | |
|---|---|---|---|---|
| Additive | (ppm)* | 0 | 100 | 200 |
| Example | 1 | 0 | 27,6 | 34 |
| | 2 | 0 | 27,5 | 38,5 |
| | 3 | 0 | 28,8 | 40 |
| | 4 | 0 | 28,7 | 34 |
| | 5 | 0 | 18,5 | 26 |

*ppm of active material.

TABLE IV

Crude of Alsace origin.

| | | Flow Point °C. | |
|---|---|---|---|
| Additive | (ppm)* | 0 | 700 |
| Product Example | 1 | 27 | 15 |
| | 2 | 27 | 15 |
| | 3 | 27 | 12 |
| | 4 | 27 | 12 |
| | 5 | 27 | 21 |

*ppm of active material.

TABLE V

Dynamic Flow Test.

| | | Distance travelled (cm) | |
|---|---|---|---|
| Additive | (ppm)* | 0 | 700 |
| Product example | 1 | 1 | 27 |
| | 2 | 1 | 28,4 |
| | 3 | 1 | 27,5 |
| | 4 | 1 | 28,6 |
| | 5 | 1 | 19,3 |

*ppm of active material.

TABLE VI

| | | Crude of Nigerian origin. | | | |
| --- | --- | --- | --- | --- | --- |
| | | Flow Point (°C.) | | | |
| Additive | (ppm)* | 0 | 100 | 200 | 700 |
| Product example | 1 | 30 | 18 | 15 | 12 |
| | 2 | 30 | 18 | 15 | 9 |
| | 3 | 30 | 18 | 15 | 12 |
| | 4 | 30 | 18 | 15 | 9 |
| | 5 | 30 | 24 | 21 | 18 |

*ppm of active material.

TABLE VII

| | | Dynamic Flow Test | | | |
| --- | --- | --- | --- | --- | --- |
| | | Distance travelled (cm) | | | |
| Additive | (ppm)* | 0 | 100 | 200 | 700 |
| Product example | 1 | 9,5 | 33,6 | 38,5 | >44 |
| | 2 | 9,5 | 32,5 | 37 | >44 |
| | 3 | 9,5 | 34,5 | 38,9 | >44 |
| | 4 | 9,5 | 33,1 | 37,8 | >44 |
| | 5 | 9,5 | 27 | 30 | 37 |

*ppm of active material

TABLE VIII

| | |
| --- | --- |
| Crude of Gabonais origin | |
| Deposit Test | |
| concentration = 2000 ppm | |
| Additives | E = reduction of deposit % |
| According to Example 1 | 50 |
| 2 | 60 |
| 5 | 40 |
| 6 | 20 |

The deposit of paraffins having a number of carbon atoms greater than 40, determined by gas phase chromatography, has been practically eliminated.

We claim:

1. A polymeric additive for inhibiting the deposit of paraffins in crude oils, comprised of a polymer formed from units consisting essentially of:
   - 20 to 99% by weight of at least one alkyl ester of an unsaturated monocarboxylic acid, containing 12 to 30 carbon atoms,
   - 0.5 to 40% by weight of at least one unsaturated alpha, beta-dicarboxylic compound in the form of the diacid, low alkyl ester or anhydride,
   - 0.5 to 40% by weight of at least one monomer having ethylenic unsaturation of the general formula:

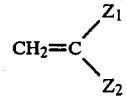  (1)

in which $Z_1$ and $Z_2$ are different and represent a member selected from the group consisting of:
hydrogen;
a halogen, such as fluorine, chlorine, bromine or iodine;
a saturated, unsaturated or aromatic hydrocarbon $C_1$ to $C_{30}$ group;
an

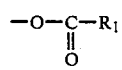

group, where $R_1$ is a $C_1$ to $C_3$ alkyl group; and an $-OR_2$ group where $R_2$ is a $C_1$ to $C_{12}$ alkyl group.

2. A polymeric additive according to claim 1, containing by weight 20% to 99% of units derived from one or more alkyl esters of unsaturated monocarboxylic acids, 0.5% to 40% of units derived from one or more unsaturated alpha,beta-dicarboxylic compounds and 0.5% to 40% of units derived from one or more monomers having ethylenic unsaturation of the general formula (1).

3. A polymeric additive according to claim 1, wherein its numerical molecular weight is in the range from 5,000 to 300,000.

4. A polymeric additive according to claim 1, wherein the alkyl esters of unsaturated monocarboxylic acids are n-alkyl acrylates or methacrylates.

5. A polymeric additive according to claim 4, wherein use is made of $C_{12}$ to $C_{30}$ n-alkyl acrylates or methacrylates.

6. A polymeric additive according to claim 5, wherein at least 80% of the n-alkyl acrylate or methacrylate units are $C_{20}$ to $C_{22}$.

7. A polymeric additive according to claim 1, wherein the unsaturated alpha,beta-dicarboxylic compound is an anhydride and particularly maleic anhydride.

8. A polymeric additive according to claim 1, wherein the monomer having ethylenic unsaturation of the general formula (1) is styrene, vinyl acetate or octadecene-1.

9. A composition of the type comprising a crude oil and a polymeric additive for inhibiting the deposit of paraffins, wherein this additive is an additive according to claim 1.

10. A composition according to claim 9, wherein the polymeric additive is utilized in a weight concentration ranging from 5 to 4000 ppm.

11. A polymer, formed from units consisting essentially of:
   - at least one alkyl ester of an unsaturated monocarboxylic acid,
   - at least one unsaturated alpha,beta-dicarboxylic compound in the form of the diacid, low alkyl ester or anhydride,
   - at least one monomer having ethylenic unsaturation of the general formula:

in which $Z_1$ and $Z_2$ are different and represent:
hydrogen;
a halogen, such as fluorine, chlorine, bromine or iodine,
a saturated, unsaturated or aromatic hydrocarbon $C_1$ to $C_{30}$ group,
an

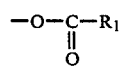

group, where $R_1$ is a $C_1$ to $C_3$ alkyl group, and an $-OR_2$ group where $R_2$ is a $C_1$ to $C_{12}$ alkyl group.

12. A polymer according to claim 11, which it contains by weight 20% to 99% of units derived from one or more alkyl esters of unsaturated monocarboxylic acids, 0.5% to 40% of units derived from one or more unsaturated alpha,beta-dicarboxylic compounds and 0.5% to 40% of units derived from one or more monomers having ethylenic unsaturation of the general formula (1).

13. A polymer according to claim 11, characterized in that its numerical molecular weight is in the range from 5,000 to 300,000.

14. A polymer according to claim 11, characterized in that the alkyl esters of unsaturated monocarboxylic acids are n-alkyl acrylates or methacrylates.

15. A polymer according to claim 14, wherein use is made of $C_{12}$ to $C_{30}$ n-alkyl acrylates or methacrylates.

16. A polymer according to claim 15, wherein at least 80% of the n-alkyl acrylate or methacrylate units are $C_{20}$ to $C_{22}$.

17. A polymer according to claim 11, wherein the unsaturated alpha,beta-dicarboxylic compound is an anhydride and particularly maleic anhydride.

18. A polymer according to claim 11, wherein the monomer having ethylenic unsaturation of the general formula (1) is styrene, vinyl acetate or octadecene-1.

19. A method for inhibiting the crystallization of paraffins in crude oils which comprises adding to said crude oils a paraffin crystallization-inhibiting amount of the polymeric additive of claim 1.

20. The method of claim 19 wherein the polymeric additive is comprised of $C_{12}$ to $C_{30}$ n-alkyl acrylates or methacrylates; maleic anhydride and an ethylenic unsaturated monomer selected from the group consisting of styrene, vinyl acetate or octadecene-1.

* * * * *

UNITED STATES PATENT AND TRADEMARK OFFICE
CERTIFICATE OF CORRECTION

PATENT NO. :  4,758,365
DATED      :  July 19, 1988
INVENTOR(S):  Meunier et al.

It is certified that error appears in the above-identified patent and that said Letters Patent is hereby corrected as shown below:

Title Page, Item [75] Replace "Gilles Neunier" with --Gilles Meunier-- and change "Reé Brouard" to René Brouard--

Item [19] "Neunier et al." should read -- Meunier --.

Signed and Sealed this

Twenty-third Day of May, 1989

*Attest:*

DONALD J. QUIGG

*Attesting Officer*      *Commissioner of Patents and Trademarks*